United States Patent [19]

Hoyt, 4th

[11] 4,309,222

[45] Jan. 5, 1982

[54] KAOLIN CLAY SLURRIES OF REDUCED VISCOSITY

[75] Inventor: Hazen L. Hoyt, 4th, Niantic, Conn.

[73] Assignee: Pfizer Inc., New York, N.Y.

[21] Appl. No.: 195,455

[22] Filed: Oct. 9, 1980

[51] Int. Cl.³ .......................... C09C 1/42; C04B 33/04
[52] U.S. Cl. ................... 106/288 B; 501/147; 501/148
[58] Field of Search ............... 106/71, 72, 288 B

[56] References Cited

U.S. PATENT DOCUMENTS

| | | | |
|---|---|---|---|
| 3,510,331 | 5/1970 | Talvenheimo et al. | 106/288 B |
| 3,736,165 | 5/1973 | Sawyer, Jr. | 106/288 B |
| 4,144,083 | 3/1979 | Abercrombie, Jr. | 106/288 B |
| 4,186,027 | 1/1980 | Bell et al. | 106/288 B |

FOREIGN PATENT DOCUMENTS 854271  10/1970  Canada .

*Primary Examiner*—O. R. Vertiz
*Assistant Examiner*—Mark Bell
*Attorney, Agent, or Firm*—Charles J. Knuth; Peter C. Richardson; Harold W. Ordway

[57] ABSTRACT

Aqueous refined kaolin clay slurries of reduced low shear viscosity are prepared by dispersing the clay under controlled pH conditions in water containing a combination of water-soluble citrate and water-soluble polyacrylate within a specified range of concentrations.

5 Claims, No Drawings

KAOLIN CLAY SLURRIES OF REDUCED VISCOSITY

BACKGROUND OF THE INVENTION

This invention concerns a method for preparing aqueous kaolin clay slurries of reduced low shear viscosity.

Kaolin clay has found many uses in the chemical and related industries. For example, it is employed extensively by the paper industry as a filler and coating pigment. For such uses, however, the naturally occurring kaolin must be refined.

In the typical refining procedure, the crude kaoline is slurried in water to a solids content of from about 35 to 45 weight percent in the presence of a primary dispersant such as sodium hexametaphosphate. The resulting slurry is screened to remove grit and then subjected to delamination and centrifugal classification to yield a fine fraction containing primarily particles of less than two microns. The fine fraction is flocculated with such as alum and sulfuric acid, bleached with such as sodium hydrosulfite, filtered and washed with water. The filtered refined clay, which has a solids content of about 60 weight percent, is then either dried to a powdered product, such as by spray drying, or redispersed in water in the presence of a secondary dispersant to a slurry having a solids content of from about 60 to 72 weight percent, using dried product as needed.

Numerous secondary dispersants have been disclosed for the dispersion of refined clay. The condensed phosphates such as sodium tripolyphosphate and tetrasodium pyrophosphate have been found effective and are commonly used for this purpose. However, these agents tend to readily degrade by hydrolysis in water, causing the clay slurry to thicken and finally gel on standing. Dispersants purported to alleviate this problem include citric acid as disclosed in U.S. Pat. No. 4,144,083 and sodium polyacrylate as disclosed in Canadian Pat. No. 854,271. Sodium polyacrylate has further been disclosed in U.S. Pat. No. 3,736,165 for use as a primary dispersant which is purported to carry through the clay refining process and act along with the added secondary dispersant such as citric acid to disperse the refined clay.

It is the primary objective of the present invention to provide a more effective dispersant system for preparing a refined kaolin clay slurry of reduced viscosity and improved viscosity stability.

SUMMARY OF THE INVENTION

I have now found that, within a limited range, the combination of citric acid with sodium polyacrylate offers an unexpected improvement both in the reduction of the low shear viscosity of high solids aqueous slurries of refined kaolin clay and in the stability of such slurries.

Accordingly, the present invention entails a method of preparing an aqueous clay slurry of reduced low shear viscosity, which comprises dispersing from about 60 to 72 percent by weight of particulate kaolin clay in water at a pH of from about 6 to 8 in the presence of from about 0.01 to 0.05 percent of water-soluble citrate, expressed as anhydrous citric acid, and from about 0.02 to 0.08 percent of water-soluble polyacrylate, expressed as sodium polyacrylate, in a ratio of from about 0.4 to 6 grams of the polyacrylate per gram of the citrate, the combined amount of the citrate and polyacrylate being from about 0.06 to 0.11 percent, each of the percentages being expressed by weight based on the weight of the clay. Preferably, the citrate is citric acid or sodium citrate; the polyacrylate is sodium polyacrylate; the ratio of polyacrylate to citrate is from about 0.5 to 3 grams per gram with the citrate percentage from about 0.02 to 0.04, the polyacrylate percentage from about 0.02 to 0.07 and the combined amount of the citrate and polyacrylate from about 0.06 to 0.10 percent; and the pH of the prepared slurry is from about 6.8 to 7.7.

DETAILED DESCRIPTION OF THE INVENTION

The method of the present invention, in using the combination of water-soluble citrate and water-soluble polyacrylate within a specified limited range, offers to the clay producer and clay user a superior system for preparing, storing and transporting dispersed refined kaolin clay slurries. The combination not only permits preparation of refined kaolin clay slurries of reduced low shear viscosity using lesser amounts of the two dispersants, but, more importantly, also insures that the slurry viscosity will not rise appreciably during storage or shipment.

The method is primarily applicable to refined kaolin clay slurries of high solids content containing from about 60 to 72 weight percent clay. Although more dilute slurries in the order of about 50 percent solids may be employed, economics dictates the use of slurries with a minimum clay content of about 60 percent. Likewise, while dispersed slurries having a clay content of as high as 75 percent may be realized, the practical upper limit is about 72 percent. The preferred clay solids content is about 70 weight percent.

In one convenient method of executing the present invention, the particulate refined kaolin clay is dispersed in water in the presence of the water-soluble citrate and the water-soluble polyacrylate in the total amount of from about 0.06 to 0.11 percent by weight of the clay, the concentrations of the individual components being from about 0.01 to 0.05 percent, expressed as anhydrous citric acid, for the citrate and from about 0.02 to 0.08 percent, expressed as sodium polyacrylate, for the polyacrylate with the weight ratio of the polyacrylate to the citrate being from about 0.4 to 6. Preferably the combined amount of the dispersants is from about 0.6 to about 0.10 percent by weight of the clay with the citrate from about 0.02 to 0.04 percent, the polyacrylate from about 0.02 to 0.07 percent and the ratio of polyacrylate to citrate from about 0.4 to 3.

The soluble citrate may be added in the form of, for example, citric acid or one of its alkali metal or ammonium salts. The preferred forms of the citrate are anhydrous citric acid, added as a 50 weight percent aqueous solution, and granular trisodium citrate dihydrate.

By water-soluble polyacrylate is meant acrylic acid or methacrylic acid polymer having a weight average molecular weight of from about 1000 to 20,000, as well as its monovalent cation salts. Preferably the polyacrylate has a weight average molecular weight of from about 1500 to 5000 and is sodium polyacrylate. Suitable commercial sodium polyacrylates includes, for example, DISPEX ® N40, a 40 percent aqueous solution supplied by Allied Colloids Inc., Ridgewood, New Jersey; SUN-KHEM ® 505, a 45 percent aqueous solution supplied by Sun Chemical Company, Charleston, South Carolina; Colloid 211, a 43 percent aqueous solution supplied by Colloids, Inc., Newark, New Jersey; NOPCOSPERSE® 44, a 42.5 percent aqeuous solution supplied by Diamond-Shamrock, New York, New York, and GOOD-RITE® K-759, a powdered product supplied by the B F Goodrich Company, Chemical Division, Cleveland, Ohio.

To realize the desired reduced low shear viscosity stability of the present invention, the pH of the dispersed slurry is adjusted during the slurry preparation to within the range of from about 6 to 8, preferably from about 6.8 to 7.7. Since the refined kaolin clay is usually slightly acidic, this adjustment is most readily accomplished by the careful addition of a strong base such as sodium hydroxide or preferably sodium carbonate.

The following example is merely illustrative and is not to be construed as limiting the invention, the scope of which is defined by the appended claims.

EXAMPLE

A series of aqeous kaolin clay slurries at a concentration of 70 weight percent clay was prepared in which, for each preparation, 1400 g of dry refined kaolin clay (HYDRITE® R, supplied by Georgia Kaolin Company, Elizabeth, New Jersey), was slowly added to a solution of the desired levels of citric acid (Citrosol® 50T, 50 weight percent aqueous solution of anhydrous citric acid, supplied by Pfizer Inc., New York, New York), sodium polyacrylate (Colloid 211, 43 weight percent aqeuous solution, supplied by Colloids, Inc., Newark, New Jersey) and anhydrous sodium carbonate powder in sufficient dionized water to give 600 g of solution, contained in a 1800 ml stainless steel beaker, using a Cowles Model 1-VG-1 dissolver set at about 2000 RPM to disperse the clay in the solution. The dissolver speed was then adjusted to about 5000 RPM and the slurry was stirred at room temperature for 10 minutes.

A portion of the dispersed slurry was transferred to a 1-pint, screw cap, wide-mouth bottle and allowed to stand at room temperature for about 4 hours to deaerate. The pH of the slurry was measured using a standard pH meter and the low shear viscosity of the slurry was determined in the bottle at room temperature (18°-23° C.) using a Brookfield Model RVT viscometer, No. 3 spindle, 20 RPM. The bottle was then capped and stored in the sealed condition for two weeks at 43° C., and the pH and viscosity of the aged slurry were then determined at room temperature.

Results of the slurry preparation, storage and testing are summarized in Table I. Results of testing, run under the above conditions, to establish the optimum dispersant level for the individual dispersants are summarized in Table II.

These results clearly show that, within the range of from about 0.06 to 0.11 gram dispersant per 100 grams of clay, the use of the citrate/polyacrylate combination offers a marked advantage over the use of the individual dispersants alone in preparing aqueous refined kaolin clay slurries. For example, slurries 4, 8 and 11 of Table I containing about 0.10 percent combined citrate plus polyacrylate have both lower initial viscosities and lower aged viscosities than either slurry 14 containing 0.10 percent polyacrylate or slurry 13 containing 0.15 percent citrate, the optimum levels of the individual dispersants as indicated by Table II.

TABLE I

| | Makeup | | | | | Properties | | | |
| | CA, %[1] | PA, %[2] | CA+PA, % | | $Na_2CO_3$, | Initial | | Aged (2 wks, 43° C.) | |
| Slurry | of Clay | of Clay | of Clay | PA/CA | % of Clay | pH | Viscosity, Cp | pH | Viscosity, Cp |
|---|---|---|---|---|---|---|---|---|---|
| 1 | 0.01 | 0.06 | 0.07 | 6.0 | 0.108 | 7.1 | 318 | 6.5 | 475 |
| 2 | 0.02 | 0.046 | 0.066 | 2.3 | 0.117 | 7.7 | 275 | 6.5 | 425 |
| 3 | 0.02 | 0.058 | 0.078 | 2.9 | 0.117 | 7.2 | 240 | 6.5 | 375 |
| 4 | 0.02 | 0.083 | 0.103 | 4.2 | 0.117 | 7.4 | 225 | 7.1 | 325 |
| 5 | 0.03 | 0.03 | 0.06 | 1.0 | 0.125 | 7.4 | 310 | 6.6 | 463 |
| 6 | 0.03 | 0.042 | 0.072 | 1.4 | 0.125 | 7.3 | 250 | 6.5 | 400 |
| 7 | 0.03 | 0.054 | 0.084 | 1.8 | 0.125 | 7.4 | 255 | 6.6 | 350 |
| 8 | 0.03 | 0.074 | 0.104 | 2.5 | 0.125 | 7.3 | 200 | 6.8 | 283 |
| 9 | 0.04 | 0.02 | 0.06 | 0.5 | 0.133 | 7.6 | 300 | 7.0 | 425 |
| 10 | 0.04 | 0.05 | 0.09 | 1.3 | 0.133 | 7.2 | 227 | 7.0 | 338 |
| 11 | 0.04 | 0.066 | 0.106 | 1.7 | 0.133 | 7.5 | 225 | 6.8 | 325 |
| 12 | 0.05 | 0.02 | 0.07 | 0.4 | 0.141 | 7.1 | 350 | 6.9 | 425 |
| 13 | 0.15[3] | — | 0.15 | — | 0.224 | 7.8 | 525 | 7.2 | 757 |
| 14 | — | 0.10[3] | 0.10 | — | 0.100 | 6.6 | 233 | 6.5 | 410 |

[1] anhydrous citric acid
[2] sodium polyacrylate
[3] optimum dispersant concentration for minimum initial slurry viscosity and for maximum viscosity stability

TABLE II

| | Makeup | | | | Properties | | | |
| | CA, %[1] | PA, %[2] | NaOH, % | $Na_2CO_3$, | Initial | | Aged (2 wks, 43° C.) | |
| Slurry | of Clay | of Clay | of Clay | % of Clay | pH | Viscosity, Cp | pH | Viscosity, Cp |
|---|---|---|---|---|---|---|---|---|
| 1 | 0.019 | — | 0.012 | 0.20 | 7.8 | 1933[3] | — | — |
| 2 | 0.037 | — | 0.023 | 0.20 | 7.8 | 960[3] | — | — |
| 3 | 0.075 | — | 0.047 | 0.20 | 7.9 | 886[3] | — | — |
| 4 | 0.149 | — | 0.093 | 0.20 | 8.0 | 650[3] | — | — |
| 5 | 0.224 | — | 0.140 | 0.20 | 8.1 | 1026[3] | — | — |
| 6 | — | 0.025 | — | 0.10 | 6.3 | 1220 | 6.1 | 2691 |
| 7 | — | 0.050 | — | 0.10 | 6.5 | 670 | 6.1 | 900 |
| 8 | — | 0.075 | — | 0.10 | 6.8 | 410 | 6.1 | 562 |
| 9 | — | 0.10 | — | 0.10 | 7.0 | 257 | 6.3 | 400 |
| 10 | — | 0.125 | — | 0.10 | 7.2 | 250 | 6.3 | 360 |
| 11 | — | 0.15 | — | 0.10 | 7.2 | 260 | 6.3 | 350 |

TABLE II-continued

| Slurry | Makeup | | | | Properties | | | |
| --- | --- | --- | --- | --- | --- | --- | --- | --- |
| | CA, %[1] of Clay | PA, %[2] of Clay | NaOH, % of Clay | Na$_2$CO$_3$, % of Clay | Initial | | Aged (2 wks, 43° C.) | |
| | | | | | pH | Viscosity, Cp | pH | Viscosity, Cp |
| 12 | — | 0.20 | — | 0.10 | 7.2 | 287 | 6.5 | 410 |

[1] anhydrous citric acid
[2] sodium polyacrylate
[3] viscosity measured with No. 3 spindle, 10 RPM (other measurements at 20 RPM)

I claim:

1. A method of preparing an aqeous clay slurry of reduced low shear viscosity, which comprises dispersing from about 60 to 72 percent by weight of particulate refined kaolin clay in water at a pH of from about 6 to 8 in the presence of from about 0.01 to 0.05 percent of water-soluble citrate, expressed as anhydrous citric acid, and from about 0.02 to 0.08 percent of water-soluble polyacrylate, expressed as sodium polyacrylate, in a ratio of from about 0.4 to 6 grams of said polyacrylate per gram of said citrate, the combined amount of said citrate and said polyacrylate being from about 0.06 to 0.11 percent, each of said percentages being expressed by weight based on the weight of said clay.

2. The method of claim 1 wherein said citrate is citric acid or sodium citrate.

3. The method of claim 1 wherein said polyacrylate is sodium polyacrylate.

4. The method of claim 1 wherein said percentage of said citrate is from about 0.02 to 0.04, said percentage of said polyacrylate is from about 0.02 to 0.07, said ratio is from about 0.5 to 3 and said combined amount is from about 0.06 to 0.10 percent.

5. The method of claim 1 wherein said pH is from about 6.8 to 7.7.

* * * * *